(12) United States Patent
Nolan (10) Patent No.: US 10,793,075 B2
(45) Date of Patent: *Oct. 6, 2020

(54) BAG HOLDER

(71) Applicant: Vernon L. Nolan, Screven, GA (US)

(72) Inventor: Vernon L. Nolan, Screven, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/258,799

(22) Filed: Jan. 28, 2019

(65) Prior Publication Data

US 2019/0217785 A1  Jul. 18, 2019

Related U.S. Application Data (63) Continuation of application No. 14/903,681, filed on Jan. 8, 2016, now Pat. No. 10,214,149.

(51) Int. Cl.
| | | |
|---|---|---|
| *B60R 7/00* | (2006.01) | |
| *B60R 7/04* | (2006.01) | |
| *B60R 7/08* | (2006.01) | |
| *B60N 2/90* | (2018.01) | |

(52) U.S. Cl.
CPC ............... *B60R 7/043* (2013.01); *B60R 7/08* (2013.01); *B60N 2002/905* (2018.02)

(58) Field of Classification Search
CPC ...... B60R 7/043; B60R 7/08; B60N 2002/905
USPC .......................................................... 224/275
See application file for complete search history.

(56) References Cited

U.S. PATENT DOCUMENTS

| | | |
|---|---|---|
| 4,681,366 A | 7/1987 | Lobanoff |
| 4,757,928 A | 7/1988 | Browne |
| 4,792,183 A | 12/1988 | Townsend, III |
| 4,971,393 A | 11/1990 | Maisenhalder |
| 5,022,570 A | 6/1991 | Watford |
| 5,573,214 A | 11/1996 | Jones et al. |
| 5,791,614 A | 8/1998 | Sims |
| 5,868,294 A | 2/1999 | Webster |
| 6,045,019 A | 4/2000 | Moses |
| 6,607,241 B2 | 8/2003 | Johnston |
| 7,201,443 B2 | 4/2007 | Cilluffo et al. |
| 7,566,036 B1 | 7/2009 | Galway |
| D599,272 S | 9/2009 | Feder |
| 8,944,302 B2 | 2/2015 | Nolan |
| 9,539,949 B2 | 1/2017 | Nuako |
| 9,827,921 B1 | 11/2017 | Green |
| 2014/0326762 A1 | 11/2014 | Nolan |

FOREIGN PATENT DOCUMENTS

GB            2439323 A      12/2007

OTHER PUBLICATIONS http://sell.lulusoso.com/selling-leads/1142984/car as viewed on Jul. 22, 2019.

*Primary Examiner* — Peter N Helvey (74) *Attorney, Agent, or Firm* — Venable LLP; Tamatane J. Aga; Elizabeth C. G. Gitlin (57) ABSTRACT

A shaped elongate strap enables a plastic grocery bag to be used for trash disposal in a vehicle. It has a shaped headrest post-gripping top portion at one end and forward and rearward grocery bag handle grips at the other end. The ends are connected by a flexible corrugated strip. The orientation of the corrugations and the spacing of the grips keep the strap from twisting and the grips forward of the back of the seat.

19 Claims, 10 Drawing Sheets

BAG HOLDER

CROSS-REFERENCES TO RELATED APPLICATIONS

This application is a continuation of U.S. patent application Ser. No. 14/903,681 filed Jan. 8, 2016, now U.S. Pat. No. 10,214,149 which is a U.S. National Stage of International Application No. PCT/US2016/012500 filed Jan. 7, 2016.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

REFERENCE TO A BIOLOGICAL SEQUENCE LISTING

Not applicable.

BACKGROUND OF INVENTION

Field of the Invention

This invention is in the field of containment of trash in vehicles as well as prevention of littering on the highways.

Description of the Related Art

An existing way of containing trash in a vehicle and preventing littering is a small trash can placed on the floor or other level surface such as a center console. Providing a means for preventing the can from tipping over is to add weight or flaps or both to the bottom, such as can be opened for viewing on a Web browser at: http://sell.lulusoso.com/selling-leads/1142984/car-waste-bin-car-trash-bin-car-waste-container.mht. A disadvantage to this is that if such a container cannot be positioned on a center console or on the floor between passengers, it takes up leg room somewhere else on the floor (and might be knocked over anyway as a result of being kicked).

One way of surmounting this difficulty is taught by several patents and patent applications which suspend a trash receptacle from a seat part such as the top of the seat back, the seat back pocket behind the seat, or the headrest. Most of these contain rigid parts which can be dangerous to occupants in the event of a sudden stop or crash. Those that suspend from the top of the seat back or the seat back pocket are not conveniently used by front seat passengers. There is a U.S. patent on trash receptacles suspended between the front seats, U.S. Pat. No. 5,868,294, but it involves specially-fabricated receptacles, and hanging mechanisms that either span from the driver's headrest to the passenger's or require snaps sewn into the sides of the seats. This patent also discloses a receptacle with hooks for hanging over the middle of a bench-style front seat, but bench-style front seats are increasingly rare. The devices described in this patent are complex and/or require special installation.

A U.K. patent publication, no. GB2439323, describes a way of suspending an essentially cost-free ordinary plastic grocery bag from one of the headrest supporting posts using a flexible strap, but still not in a position convenient to the front seat passengers. Similar drawbacks are associated with U.S. Pat. No. 6,045,019. The '019 patent describes an elongate strap with a plurality of "hooks" (slots or grooves) cut into it at either end. U.S. Pat. No. 5,791,614 describes a headrest-mounted hanger that performs a similar function using both of the two headrest supporting posts on one of the front seats to suspend basically any bag with a strap close to the side of the seat. While it is true that the flexible hanger of U.K. publication GB2439323 and the hanger of U.S. Pat. No. 5,791,614 appear to be low in manufacturing cost, and capable of hanging a plastic grocery bag, neither of these hold the handles of such a bag apart so that trash can be put into the bag with one hand. The former of these has the further disadvantage of swinging on the headrest post during travel, and the latter has the further disadvantage of the bag handle slipping off the hanger during travel.

There is thus a need for an apparatus that permits hanging a recyclable and cost-free bag securely between the front seats and holding the handles apart regardless of the motion of the vehicle. U.S. Pat. No. 8,944,302 by the instant inventor, granted Feb. 3, 2015, describes a plastic bag holder that is similar to the instant invention, however the instant invention represents a significant improvement in terms of accessibility and safety.

BRIEF DESCRIPTION OF THE INVENTION

The instant invention is an elongate strap that, by itself, enables a plastic grocery bag to be used conveniently and inexpensively for trash disposal in a vehicle. It has a specially-shaped headrest post seat top portion at one end and a specially-shaped bag handle seat side portion at the other. The shaped seat top portion is placed to securely encircle both headrest posts on a vehicle seat, allowing the strap to drape over the shoulder of the seat so that the seat side portion hangs between the seats, while projecting the seat side portion forward to make it more accessible to receive waste and less intrusive into the legroom of the rear seat. The seat side portion comprises two spaced-apart hook parts which hold the handles of a plastic grocery bag apart for easy disposal of trash by either the left or the right seat occupant, as well as occupants of the seat behind the front seats. A shaped center portion of the device is much more flexible in the elongate direction than in the transverse direction so that it can easily drape over seat shoulders of varying widths and shapes, while at the same time maintaining the normal inclination of the seat and resisting the tendency of the strap to flop rearward under the weight of the bag.

DETAILED DESCRIPTION OF THE INVENTION

Referring now to the drawings, in which like reference characters refer to like elements among the drawings, it is to be noted that reference to placement within a vehicle is under the assumption that the vehicle is a left-hand-drive vehicle. The invention as described here is therefore constructed so as to be placed optimally on the right hand (passenger's) front seat of such a vehicle. This invention is not restricted to that shape, however, and may be constructed in the mirror image of that which is shown here and still be fully within the scope of this invention. Such a device could be installed on a seat mounted on the left side of a vehicle.

Dashed lines indicate structure that is environmental to the invention.

Figure 1:
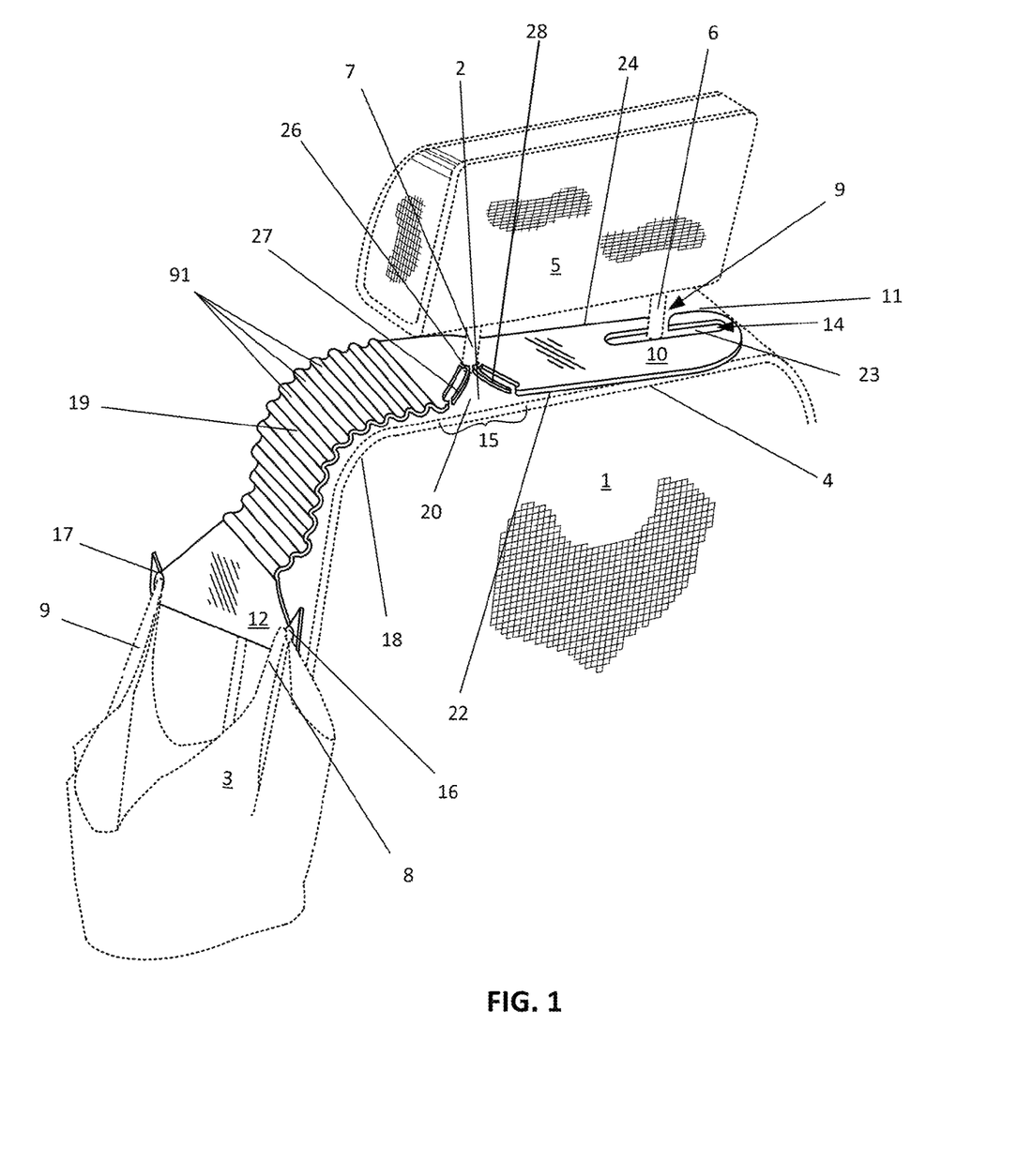
FIG. 1 is an oblique view of the invention in place on the front passenger's seat of a vehicle as seen from behind the driver's seat.

FIG. 1 is an oblique view of the invention in place on the front passenger's seat 1 of a vehicle as seen from behind the driver's seat (not shown). The invention comprises three parts, a shaped seat top portion 10 generally disposed along the top 2 of a vehicle seat 1 below the headrest 5, a flexible middle portion 19 generally disposed over the shoulder 18 of the vehicle seat, and a shaped seat side portion 12 generally disposed vertically along the side of the seat closest to the centerline of the vehicle. The seat top portion 10 comprises a first headrest post slot 14 which engages the first headrest support post 6 closest to the vehicle door (farthest from the centerline of the vehicle) and a second headrest post slot 15 which engages the headrest support post 7 nearest the centerline of the vehicle. These post slots are specially shaped in accordance with the instant invention to secure the invention to the headrest posts in such a way as to prevent the invention from being dislodged by motion of the vehicle or ordinary activity of the passengers. The first headrest post slot 14 comprises a substantially obround hole 23 disposed along the seat top portion 10 of the invention parallel to its forward edge 24. The seat top portion 10 of the invention is mounted on the first headrest support post 6 by pushing the seat top portion 10 toward the first headrest post 6 through a first access slot 9 connecting the forward edge 24 of the seat top portion 10 to the obround hole 23. The second headrest post slot 15 is a V-shaped cavity in the seat top portion 10 beginning with an entryway 20 on the rearward edge 22 of the seat top portion 10 of the invention and ending with a second headrest post collar 26 which partially encircles the second headrest post 7. The seat top portion 10 of the invention is mounted on the second headrest support post 7 by sliding the seat top portion of the invention to the left or right in this view while maintaining the first headrest post 6 within the obround hole 23 until the second headrest post 7 is proximate to the entryway 20. The second headrest post 7 is then snapped around the post collar 26 by pulling the seat top portion 10 towards the second headrest post 7 until the post 7 pops through the flexible tabs 27 and 28.

The flexible middle portion 19 is shown here comprised of a concatenation of parallel semi-cylindrical corrugations 91 which are designed to make the middle portion more flexible in a direction following the contour of the seat shoulder 18 and less flexible in a direction perpendicular to that. It is within the scope of this invention that the corrugations 91 could have alternative cross-sections such as accordion pleats or parallel variations in material thickness as examples without limitation which should be regarded as equivalent. The middle portion could, within the scope of this invention, be flat, in which case it would still flex more easily in the elongate (over the shoulder) direction than in the transverse direction merely because the length is greater than the width. The corrugations 91 demonstrably magnify the resistance to flexion in the transverse direction.

Figure 11:
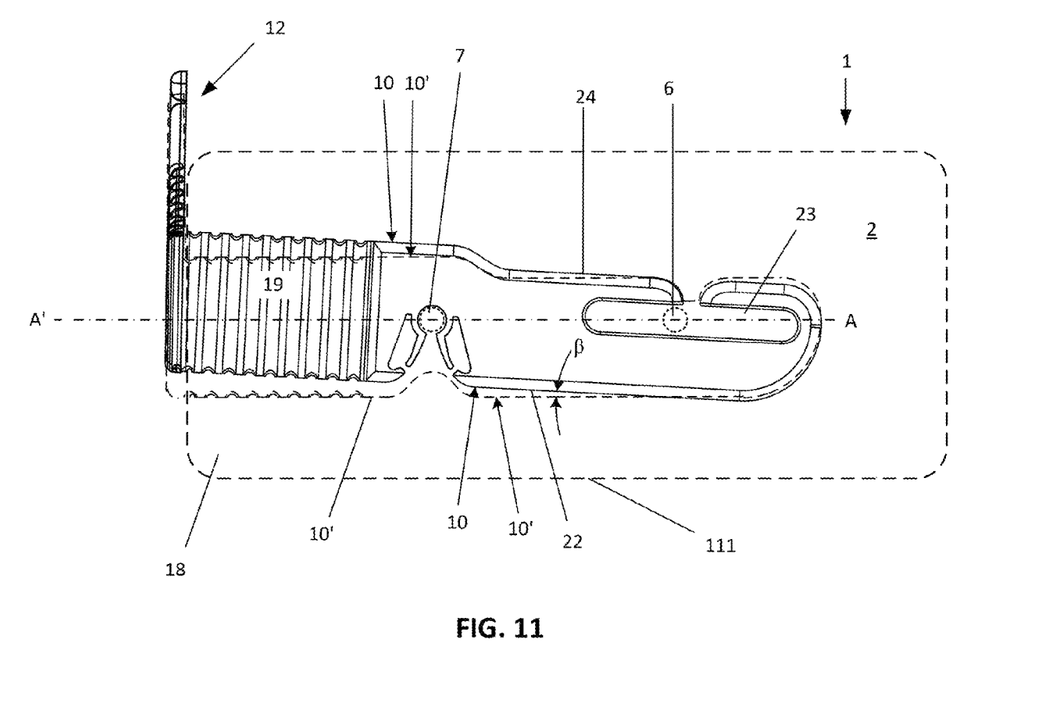
FIG. 11 is a top view of the invention in place on the front passenger's seat of a vehicle.
Figure 12:
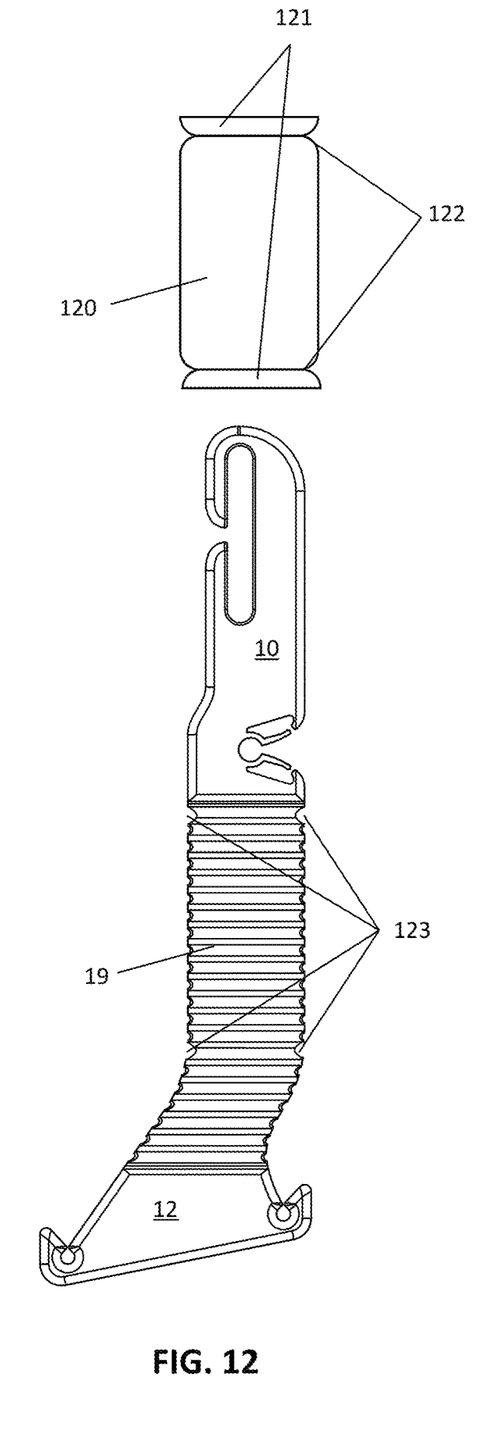
FIGS. 12 and 13 are front views of a second embodiment of the invention comprising an optional sleeve.
Figure 13:
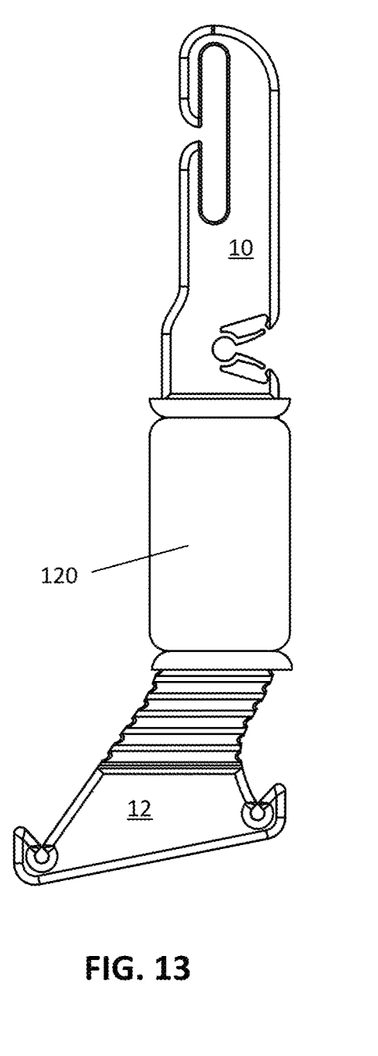

The seat side portion 12 of the invention has rear and front hook parts 16 and 17 respectively for removably securing the handles of a waste bag 3 to the invention (See also FIGS. 11-13). These hook parts are specially shaped in accordance with the instant invention to secure the handles of a waste bag to the seat side portion 12 in such a way as hold the handles apart and prevent the bag from being inadvertently dislodged by motion of the vehicle or ordinary activity of the passengers.

Figures 2, 4, 5, 6:
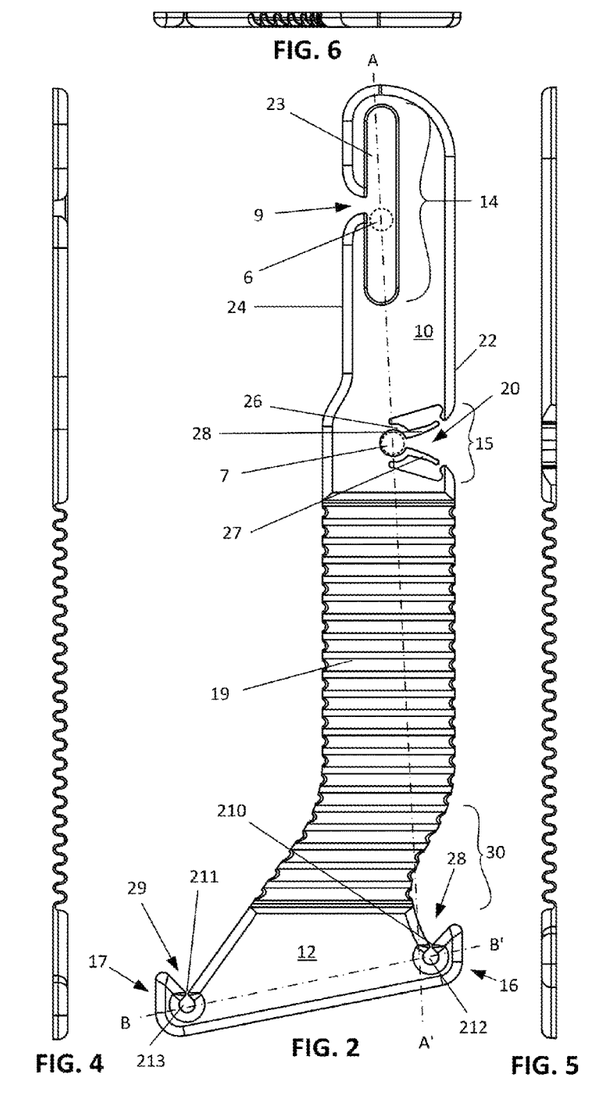
FIG. 2 is a front, flattened out, view of the invention.
FIG. 4 is a left side view of the invention.
FIG. 5 is a right side view of the invention.
FIG. 6 is a top view of the invention.

Many of the details shown in FIG. 1 are also shown for additional clarity in FIG. 2. FIG. 2 is a front view of the invention flattened out, that is, not in place on a vehicle seat. Note that the line A-A' passing through the centers of the headrest posts 6 and 7 is not parallel to the forward and rearward edges 24 and 22 of the invention. This will be the case no matter where headrest post 6 lies within obround 23 (i.e., no matter what the separation of the headrest posts is for a particular model of vehicle). This is intentional, and has the effect of angling the seat side portion 12 of the invention farther forward relative to the seat back (which will be substantially parallel to the line A-A'). For further explanation, see FIG. 11.

The shape of the hook parts 16 and 17 is designed to retain the handles of a plastic bag reliably during travel without making them difficult to detach for disposal (see also FIGS. 11-13). The rear and front hook parts 16 and 17 respectively each have a funnel portion 28 and 29 respectively which serves as a guide for inserting the rear and front handles of a waste bag (not shown) into the seat side portion 12 of the invention. Pulling down on the one handle of a bag will force it through the rear nip 210 and into the rear teardrop hole 212. Likewise, pulling downward on the other handle of the bag will force it through the front nip 211 and into the front teardrop hole 213.

Note that the general J-shape of the invention puts the front hook cutout 17 well forward of the line A-A'. This places the waste bag forward of where it would be otherwise and generally more accessible to the front seat occupants. The rearward edge 22 comprises a recess 30 which enables rear hook cutout 16 to be accessed by a rear trash bag handle while not protruding into the rear passengers' leg area and posing a potential catch hazard to rear occupants.

Note also that the line B-B', joining the centers of holes 212 and 213, is not horizontal. This is to take into account that seat backs in vehicles are rarely set to vertical even if they can be so adjusted.

Figure 3:
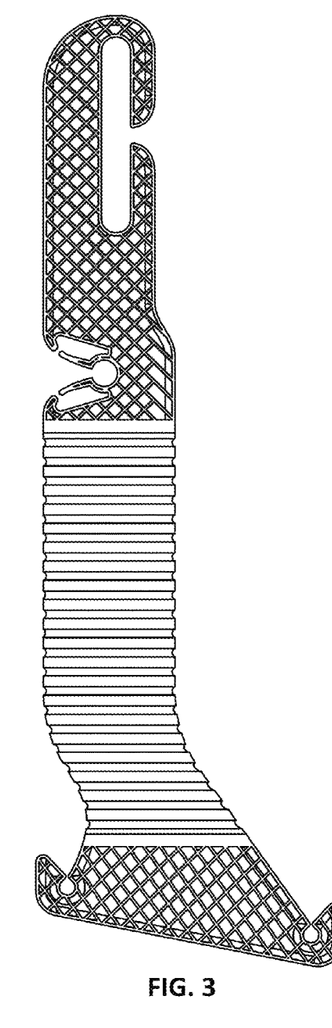
FIG. 3 is a rear view of the invention.

FIG. 3 is a rear view of the invention.

FIG. 4 is a left side view of the invention.

FIG. 5 is a right side view of the invention.

FIG. 6 is a top view of the invention.

Figure 7:
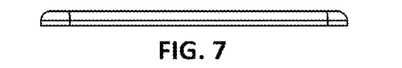
FIG. 7 is a bottom view of the invention.

FIG. 7 is a bottom view of the invention.

Figure 8:
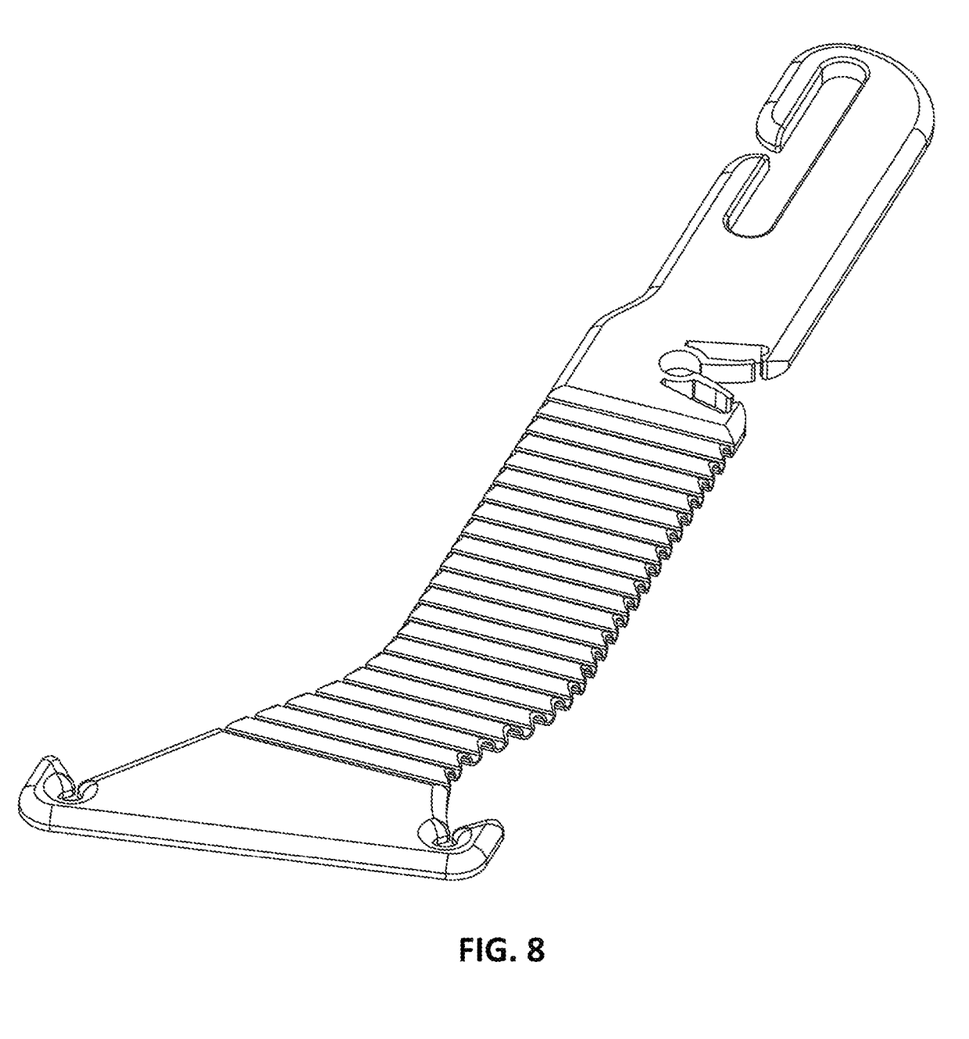
FIG. 8 is an oblique view of the invention from the front.

FIG. 8 is an oblique view of the invention from the front.

Figure 9:
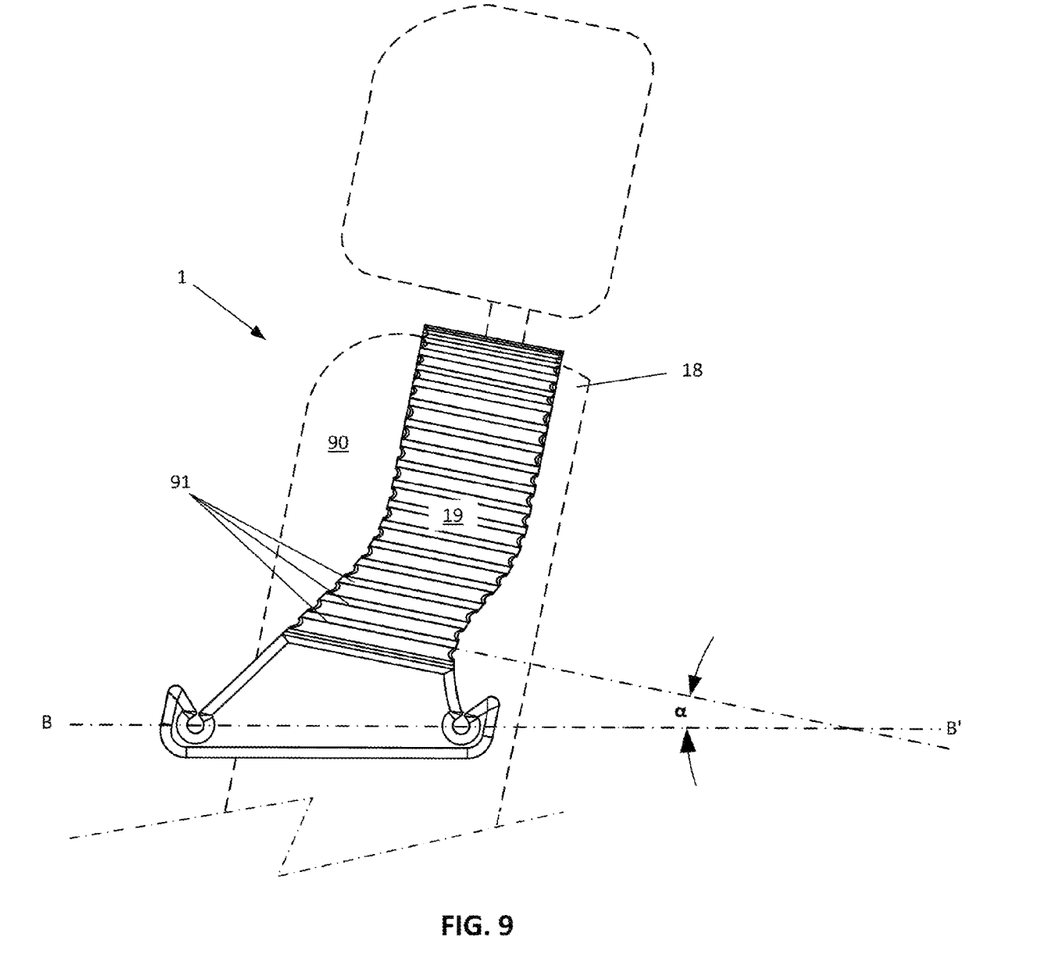
FIG. 9 is a view of the invention in place on the side of a vehicle seat.

FIG. 9 is a view of the invention in place on the side 90 of a vehicle seat 1. The flexible middle portion 19 of the invention comprises a series of parallel corrugations 91 which are all at an acute non-zero angle α from line B-B'. This arrangement of corrugations 91 forces the middle portion 19 to drape over the shoulder 18 of the seat 1 in a direction that conforms to the incline of the seat 1 rather than the vertical. Normally, the incline of the front seats in a vehicle is adjustable, but in this invention the angle α has been selected to be close to the normal incline of a seat rather than the zero incline taught by U.S. Pat. No. 8,944,302.

Figure 10:
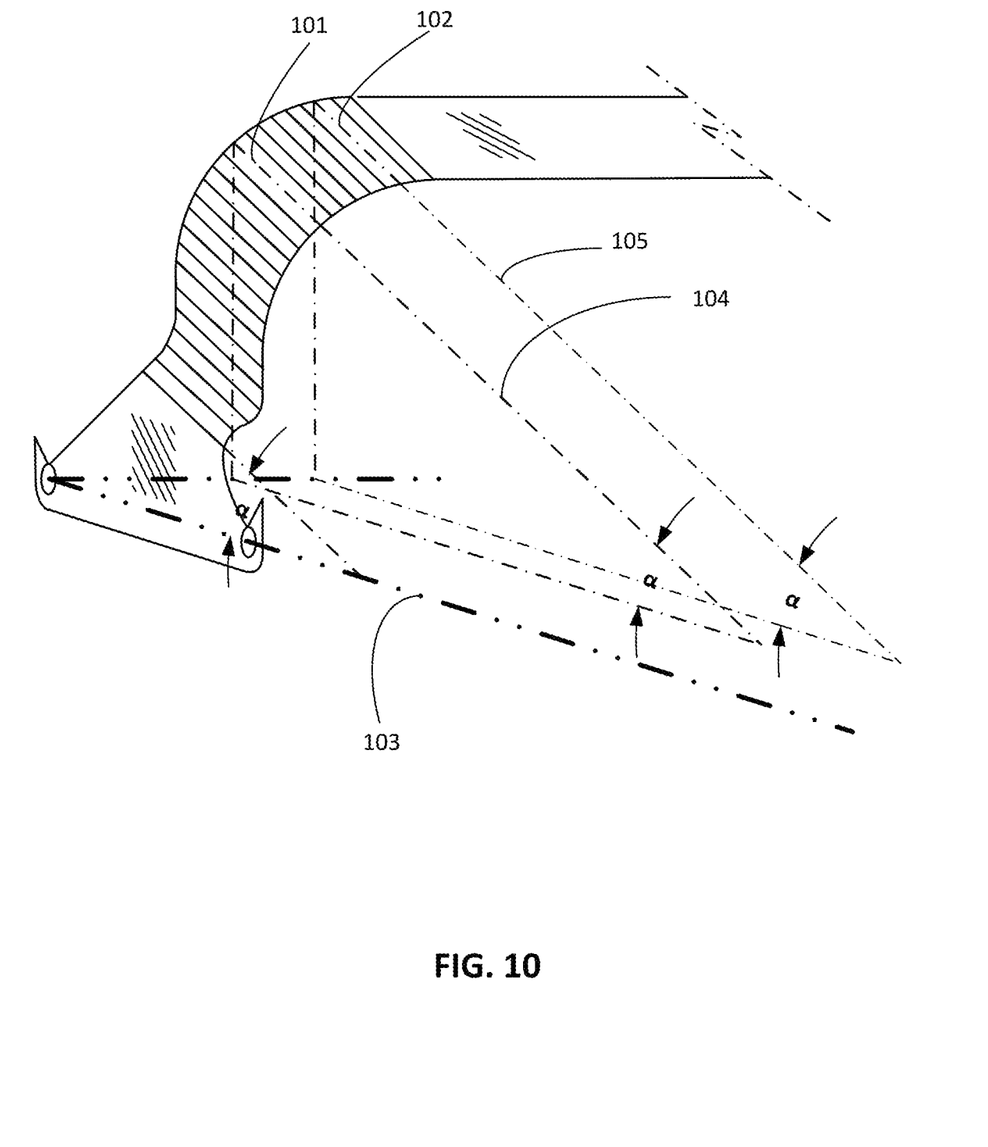
FIG. 10 is a simplified oblique view of the invention in place on the front passenger's seat of a vehicle as seen from behind the driver's seat.

FIG. 10 is a simplified oblique view of the invention in place on the front passenger's seat 1 of a vehicle as seen from behind the driver's seat. It shows how the drape of the invention over the shoulder of the seat is controlled by the angle α between all corrugations, e.g., 101 and 102, and horizontal plane 103, being equal in all vertical planes containing such corrugations, e.g., planes 104 and 105 respectively. Planes 101 and 102 are indicated by dash-dot lines and plane 103 is indicated by bold dash-dot-dot lines.

FIG. 11 is a top view of the invention in place on the top 2 of the front passenger's seat 1 of a vehicle. It is draped at left over the shoulder 18 of the seat. Note that the line A-A' passing through the centers of the headrest posts 6 and 7 is not parallel to the forward and rearward edges (24 and 22, respectively) of the top portion of the invention. This will be the case no matter where headrest post 6 lies within obround 23 (i.e., no matter what the separation of the headrest posts is for a particular model of vehicle). This is intentional, and has the effect of angling the seat side portion 12 of the invention farther forward relative to the seat back 111 by a small angle β between the seat top portion 10 of the invention and the position it would have occupied were it not angled forward, represented by dashed outline 10'.

FIGS. 12 and 13 are front views of a second embodiment of the invention comprising an optional decorative sleeve 120. FIG. 12 shows the sleeve 120 before placement on the elongate strap of the invention. The sleeve 120 is comprised of flexible sheet material, e.g., cloth, formed into a hollow cylinder and sized to slip over and downward past the seat top portion 10 and be removably fixed on a substantially rectangular part 124 of the flexible middle portion 19. The ends of the sleeve 120 have cuffs 121 with elastic bands 122 sewn in or fastened thereabout. In this embodiment, the flexible middle portion 19 of the elongate strap comprises cutouts 123 positioned to receive the elastic bands 122. FIG. 13 shows the sleeve 120 in place around the flexible middle portion 19. The sleeve 120 may be optionally decorated with a pattern, an insignia, logo, etc.

Figure 14:
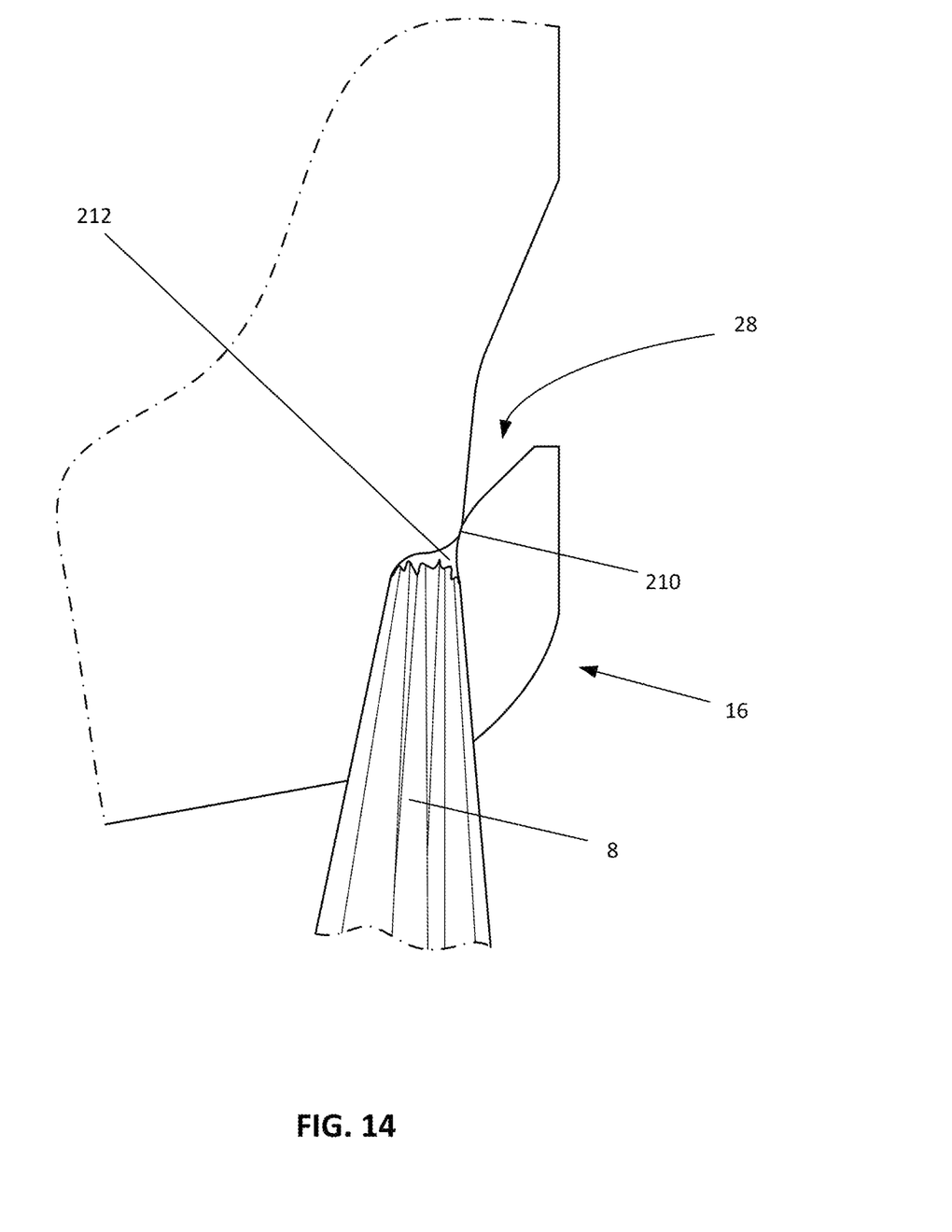
FIG. 14 is a close-up perspective view of the rear hook cutout of the invention gripping the rear handle of a plastic grocery bag under steady vehicle motion.

FIG. 14 is a close-up perspective view of the rear hook cutout 16 of the instant invention gripping one handle 8 of a plastic grocery bag under steady vehicle motion. The rear nip 210 will keep the handle from emerging from the rear teardrop hole 212 during a sudden downward acceleration of the vehicle (as would occur driving over a deep pothole, for example).

Figure 15:
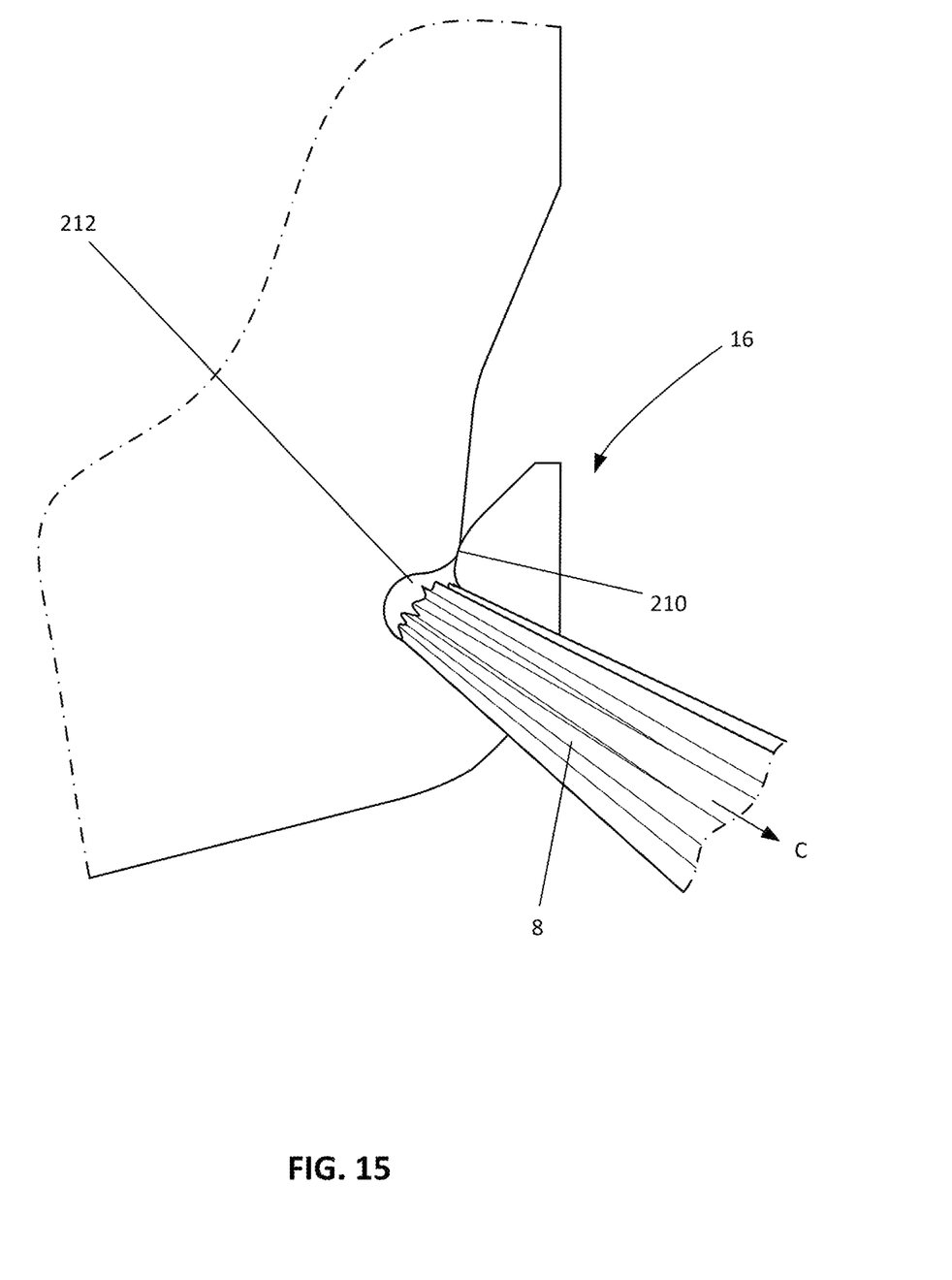
FIG. 15 is a close-up perspective view of the rear hook cutout of the invention gripping the rear handle of a plastic grocery bag under sudden acceleration.

FIG. 15 is a close-up perspective view of the rear hook cutout 16 of the instant invention gripping one handle 8 of a grocery bag under sudden acceleration. The combined force of gravity and forward acceleration pull the bag and its contents in the direction C. However, no reasonable movement of the vehicle would rotate the bag handle 8 far enough upward or with enough force to pull it through the rear nip 210 and out of the rear teardrop hole 212.

Figure 16:
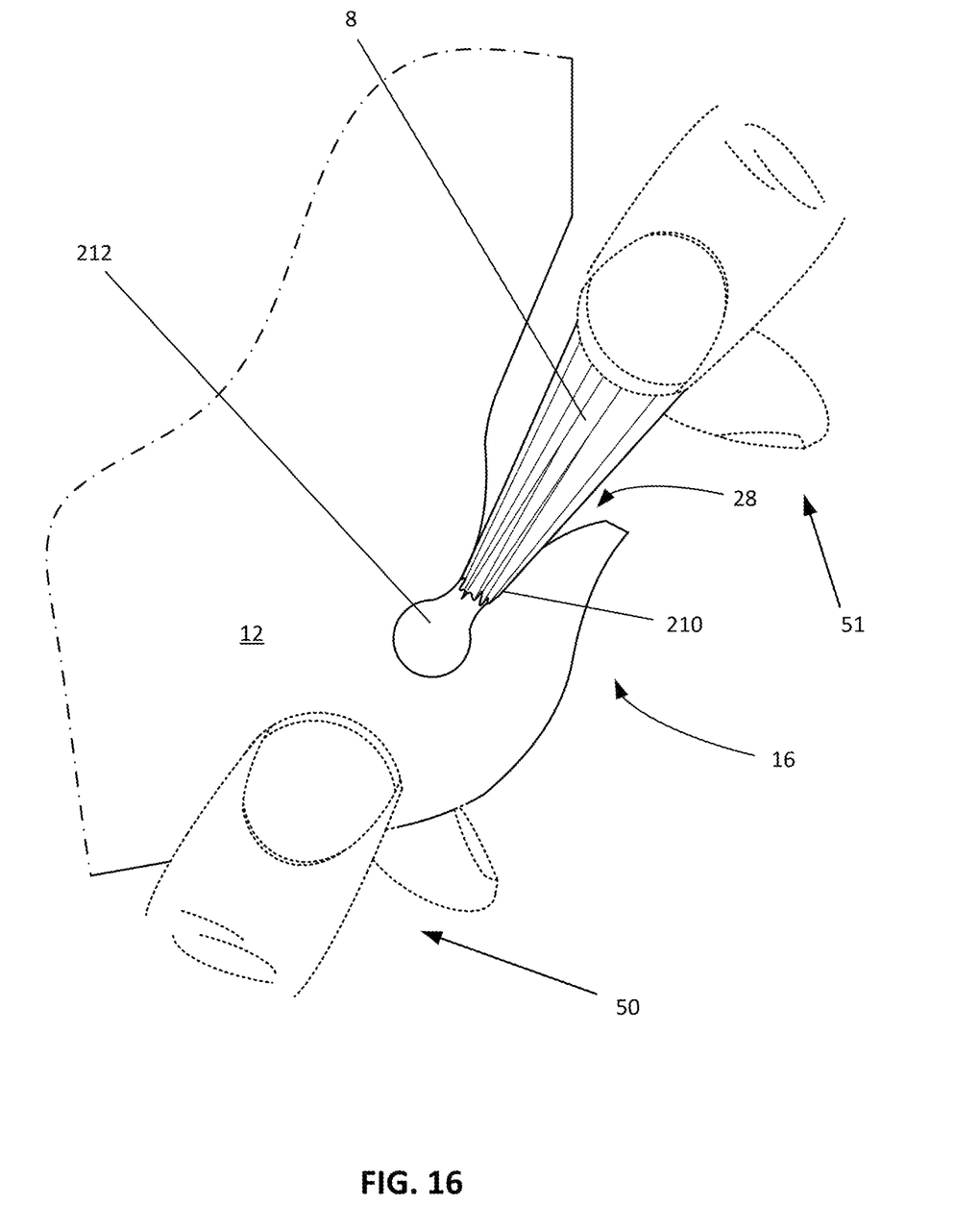
FIG. 16 is a close-up perspective view of the rear hook cutout of the invention while the rear handle of a plastic grocery bag is being removed from it.

FIG. 16 is a close-up perspective view of the rear hook cutout 16 of the instant invention while a person is removing the trash bag handle from the rear hook cutout 16. Here, a person is holding the seat side portion 12 with his or her left fingers 50 while pulling the bag handle 8 upward with the fingers of his or her right hand 51. Because the material of the seat side portion 12 is flexible and because the teardrop hole 212 is teardrop-shaped with the narrow part leading upward to the nip 210, it is a simple matter for any person to pull the handle 8 through the rear nip 210.

The foregoing is a description of preferred embodiments of the invention. In other embodiments, this invention may be modified for use in other vehicles (e.g., boats and aircraft) and for use in the home. In these circumstances the seat side portion may be connected to a seat back portion modified to suspend the invention from fixtures within such other vehicles and residences.

The invention claimed is:

1. A bag holder configured to be attached to a seat, the bag holder comprising:
    a top portion having a front edge, a rear edge, and a side edge, wherein the top portion is configured to attach to a plurality of posts extending from the seat;
    a middle portion having a plurality of corrugations configured to increase flexibility of the middle portion along a contour of the seat, wherein the middle portion extends from the side edge of the top portion, wherein the middle portion is less flexible in a direction perpendicular to the contour of the seat, wherein the middle portion is more flexible than the top portion along the contour of the seat;
    a lower portion extending from the middle portion, the lower portion having a plurality of hooks along an axis and configured to hold a bag; wherein the axis is not parallel to the side edge of the top portion.

2. The bag holder of claim 1, wherein the axis extends between a center of a first hook and a center of a second hook.

3. The bag holder of claim 1, wherein the plurality of corrugations are parallel to the side edge of the top portion.

4. The bag holder of claim 1, wherein the plurality of hooks comprises a first hook at a front of the lower portion and a second hook at a rear of the lower portion.

5. The bag holder of claim 4, wherein middle portion forms a recess next to the second hook at the rear of the lower portion.

6. The bag holder of claim 1, wherein the top portion comprises a first opening configured to receive a first post extending from the seat, and a second opening configured to receive a second post extending from the seat.

7. The bag holder of claim 6, wherein the first opening comprises an elongated hole through the top portion extending from the front edge of the top portion.

8. The bag holder of claim 7, wherein the second opening comprises a hole through the top portion extending from the rear edge of the top portion.

9. The bag holder of claim 8, wherein the second opening further comprises a plurality of resilient tabs extending therefrom, wherein the plurality of resilient tabs are opposed from each other and are configured to grip the second post.

10. The bag holder of claim 6, wherein, when the bag holder is attached to the seat, a post axis extends between the plurality of posts, wherein a top portion axis extend in a longitudinal direction through the top portion, wherein the post axis and the top portion axis are not parallel.

11. The bag holder of claim 10, wherein the first opening comprises a hole elongated in the longitudinal direction through the top portion.

12. The bag holder of claim 1, wherein, when the bag holder is attached to the seat, the bag holder is configured to locate the plurality of hooks at a side of the seat.

13. The bag holder of claim 1, wherein the top portion is planar and is configured to be disposed on a vehicle seat.

14. The bag holder of claim 13, wherein the plurality of posts extending from the seat comprise posts for a headrest attached to the seat.

15. The bag holder of claim 13, wherein the middle portion and the lower portion are configured to hang in a substantially vertical plane along a side of the seat.

16. The bag holder of claim 1, further comprising a sleeve configured to receive at least a portion of the bag holder, the sleeve comprising an elastic band.

17. The bag holder of claim 16, further comprising a plurality of cutouts at a front and a rear of the bag holder, wherein the cutouts are configured to receive the elastic band therearound.

18. The bag holder of claim 1, wherein the side edge of the top portion divides the different flexibilities of the middle portion and the top portion.

19. A bag holder configured to be attached to a seat, the bag holder comprising:

a top portion having a front edge, a rear edge, and a side edge, wherein the top portion is configured to attach to a plurality of posts extending from the seat;

a middle portion extending from the side edge of the top portion, wherein the middle portion is configured to be flexible along a contour of the seat, wherein the middle portion is less flexible in a direction perpendicular to the contour of the seat;

a lower portion extending from the middle portion, the lower portion having a plurality of hooks along an axis and configured to hold a bag; wherein the axis is not parallel to the side edge of the top portion, wherein the top portion comprises a first opening configured to receive a first post extending from the seat, and a second opening configured to receive a second post extending from the seat, wherein the first opening comprises an elongated hole through the top portion extending from the front edge of the top portion, wherein the second opening comprises a hole through the top portion extending from the rear edge of the top portion, wherein the second opening further comprises a plurality of resilient tabs extending therefrom, wherein the plurality of resilient tabs are opposed from each other and are configured to grip the second post.

\* \* \* \* \*